(12) United States Patent
Kancherla et al.

(10) Patent No.: US 11,258,816 B2
(45) Date of Patent: Feb. 22, 2022

(54) MANAGING FIREWALL RULES BASED ON TRIGGERING STATISTICS

(71) Applicant: VMware, Inc., Palo Alto, CA (US)

(72) Inventors: Mani Kancherla, Cupertino, CA (US); Jian Lan, Beijing (CN); Xi Zeng, Beijing (CN); Hailing Xu, Beijing (CN); K. Antion Shiban, Pune (IN)

(73) Assignee: VMWARE, INC., Palo Alto, CA (US)

( * ) Notice: Subject to any disclaimer, the term of this patent is extended or adjusted under 35 U.S.C. 154(b) by 144 days.

(21) Appl. No.: 16/546,513

(22) Filed: Aug. 21, 2019

(65) Prior Publication Data

US 2021/0029146 A1 Jan. 28, 2021

Related U.S. Application Data

(63) Continuation of application No. PCT/CN2019/097242, filed on Jul. 23, 2019.

(51) Int. Cl.
*H04L 29/06* (2006.01)
*H04W 12/08* (2021.01)

(52) U.S. Cl.
CPC ...... *H04L 63/1425* (2013.01); *H04L 63/0263* (2013.01); *H04L 63/20* (2013.01); *H04W 12/08* (2013.01)

(58) Field of Classification Search
CPC . H04L 63/0263; H04L 63/20; H04L 63/1425; H04W 12/08; H04W 12/088
See application file for complete search history.

(56) References Cited

U.S. PATENT DOCUMENTS

| | | | | |
|---|---|---|---|---|
| 7,934,248 B1* | 4/2011 | Yehuda | ............... | H04L 41/0893 726/1 |
| 9,838,354 B1* | 12/2017 | Tulasi | ................ | H04L 63/0263 |
| 2005/0008001 A1* | 1/2005 | Williams | ............ | H04L 63/0218 370/352 |
| 2006/0248580 A1* | 11/2006 | Fulp | ........................ | H04L 63/20 726/11 |
| 2008/0148382 A1* | 6/2008 | Bartholomy | ............ | H04L 12/66 726/11 |
| 2018/0091474 A1* | 3/2018 | Tulasi | ..................... | H04L 63/02 |
| 2018/0176185 A1* | 6/2018 | Kumar | ................. | H04L 63/104 |

* cited by examiner

*Primary Examiner* — Matthew T Henning
(74) *Attorney, Agent, or Firm* — Patterson & Sheridan, LLP (57) ABSTRACT

Embodiments described herein relate to managing firewall rules. Embodiments include identifying a plurality of firewall rules for request handling. Embodiments include determining a deny count for each given firewall rule of the plurality of firewall rules based on a number of requests flagged on account of the given firewall rule. Embodiments include determining an anomaly score for each given firewall rule of the plurality of firewall rules indicating a severity of attacks the given firewall rule protects against. Embodiments include determining an urgency measure for each given firewall rule of the plurality of firewall rules based on the deny count for the given firewall rule and the anomaly score for the given firewall rule. Embodiments include determining an update to at least one firewall rule of the plurality of firewall rules based on the urgency measure for each given firewall rule of the plurality of firewall rules.

20 Claims, 4 Drawing Sheets

300

| URGENCY MEASURE | FIREWALL RULE |
|---|---|
| 40 | RULE 22 |
| 25 | RULE 305 |
| 18 | RULE 90 |
| 10 | RULE 65 |
| 7 | RULE 253 |

MANAGING FIREWALL RULES BASED ON TRIGGERING STATISTICS

RELATED APPLICATIONS

The present application claims priority to International Application Serial No. PCT/CN2019/097242, filed Jul. 23, 2019, entitled "MANAGING FIREWALL RULES BASED ON TRIGGERING STATISTICS," which is assigned to the assignee hereof, and expressly incorporated herein by reference.

BACKGROUND

Many applications in modern computing environments are web based. Attacks on web-based applications are often sophisticated, and standard firewalls cannot always detect or prevent them, as the attacks look very much like valid web requests. Certain firewalls are designed specifically to address these attacks, and are often built as rule engines. Similar to how an anti-virus application uses signatures to detect viruses, a firewall may use rules to detect and protect against web attacks. Writing secure firewall rules is non-trivial, as it requires expertise and careful consideration of various bypass techniques available to the attacker. As such, firewall users generally prefer to use a rule set that is vendor-provided or community validated instead of writing their own.

A major challenge with applying firewall rules for web applications is that there may be a significant number of false positives. A false positive occurs when a firewall rule incorrectly identifies a request, such as a hypertext transfer protocol (HTTP) request, as an attack when the request in fact corresponds to the expected and desired behavior of the application. For instance, trying to access a web server using the server's internet protocol (IP) address is not commonly done and hence it is often considered an anomaly. It could be a scripted attack, or it could just be a client legitimately accessing an application using the IP address, and hence a valid use case.

To address false positives, typically it is recommended that an administrator first configure a firewall to be run in a detection mode where the firewall detects and only reports and logs what it considers an attack but does not deny any requests. The administrator is then expected to go through the logs, find the requests that are flagged as attacks, and then further examine the details to determine if they are really attacks or false positives. Once a false positive is identified for a particular request, the administrator needs to identify which firewall rules were triggered for that particular request and why those rules determined the request to be an attack. The administrator may then define exceptions for one or more of those firewall rules. This process can be challenging and time-consuming. Having defined exceptions, the administrator can then configure the firewall to run in a protection mode where requests are actually denied if they are deemed to be attacks by the firewall. As such, there is a need in the art for improved techniques for managing firewall rules.

SUMMARY

Herein described are one or more embodiments of a method for managing firewall rules. The method generally includes identifying a plurality of firewall rules for request handling. The method further includes determining a deny count for each given firewall rule of the plurality of firewall rules based on a number of requests flagged on account of the given firewall rule. The method further includes determining an anomaly score for each given firewall rule of the plurality of firewall rules indicating a severity of attacks the given firewall rule protects against. The method further includes determining an urgency measure for each given firewall rule of the plurality of firewall rules based on the deny count for the given firewall rule and the anomaly score for the given firewall rule. The method further includes determining an update to at least one firewall rule of the plurality of firewall rules based on the urgency measure for each given firewall rule of the plurality of firewall rules. The method further includes modifying the at least one firewall rule based on the update.

Also described herein are embodiments of a computer system, wherein software for the computer system is programmed to execute the method described above for managing firewall rules.

Also described herein are embodiments of a non-transitory computer readable medium comprising instructions to be executed in a computer system, wherein the instructions when executed in the computer system perform the method described above for managing firewall rules.

DETAILED DESCRIPTION

Identifying false positives and creating rule exceptions is an important but challenging and time-consuming part of deploying a firewall. Reviewing logs, one log entry at a time, to identify all firewall rules that are contributing to request denials is very cumbersome. Furthermore, a given request may trigger more than one firewall rule and the determination of whether it is an attack may be made collectively based on all of the firewall rules that were triggered, rather than based on a single firewall rule.

In some firewalls, each firewall rule is assigned an anomaly score based on the severity of the attack it is protecting against. The anomaly score is generally assigned to the given firewall rule in advance, such as by an administrator or a creator of the rule. A given request may trigger one or more firewall rules, and the request is assigned a total score which is an aggregate of the anomaly scores of all the rules that the request triggered. According to certain techniques, if this score crosses a configured threshold, then that request is deemed to be an attack. This technique allows a firewall to identify certain clandestine attacks that only trigger lower severity firewall rules, but a plurality of them. As such, the determination of a request to be an attack may not be the result of a single firewall rule, but may be the result of a combination of all firewall rules that were triggered. This makes it even more challenging for an administrator to determine which firewall rules are really causing false positives.

Often it may not be necessary to identify every single firewall rule that is getting triggered and address each one of them via exceptions to eliminate false positives. For a given web application, there are typically a few firewall rules that are being triggered more often than others, and addressing those may substantially eliminate false positives. Identifying these critical firewall rules and addressing only those saves an administrator significant time and effort.

Accordingly, embodiments of the present disclosure involve determining an urgency measure for each firewall rule associated with a given firewall. The urgency measure for a given firewall rule is determined based on both a "deny count" for the given firewall rule, the deny count indicating how many requests have been denied because of the given firewall rule, and the anomaly score for the given firewall rule. In some embodiments, the urgency measure for a given firewall rule is determined by multiplying the deny count for the given firewall rule by the anomaly score for the given firewall rule to produce a product and then normalizing the product relative to other firewall rules to produce a value within a particular range, such as between one and zero. In certain examples, normalizing the product includes multiplying the product by 100 and then dividing the result by the sum of respective products of the respective deny counts and the respective anomaly scores of all respective firewall rules.

In certain embodiments, the deny count is determined while running the firewall in a detection mode where requests that are identified as attacks based on one or more firewall rules are not actually denied but only logged as requests that would have been denied if the firewall were running in protection mode. Each time a request is identified as an attack based on one or more firewall rules being triggered, the deny count of each of the one or more firewall rules that were triggered is incremented by one.

Once urgency measures are determined for all firewall rules, the urgency measures are used to identify firewall rules that require more urgent attention from an administrator. For instance, an order for displaying the firewall rules via a user interface associated with the firewall may be determined based on the urgency measures. In some embodiments, the firewall rules are sorted according to urgency measures such that firewall rules with higher urgency measures are displayed before firewall rues with lower urgency measures. In one example, an administrator accesses a user interface associated with the firewall to review logged results from the detection mode in order to identify false positives. The logged results may be sorted according to urgency measures of firewall rules referenced in the logged results. As such, the administrator is presented with more urgent results first so that these items can be addressed. In certain embodiments, the administrator reviews incidents where requests were flagged as attacks based on firewall rules with high urgency measures in order to determine whether the incidents are false positives and, consequently, whether to define exceptions to any particular firewall rules to prevent false positives in the future.

It is noted that, while certain embodiments involve running a firewall in detection mode to determine deny counts, other embodiments involve determining deny counts while the firewall is running in protection mode where flagged requests are actually denied.

Additionally or alternatively, other techniques may be used to resolve false positives based on the urgency measures. For example, all firewall rules with an urgency measure above a threshold, or all log entries corresponding to such firewall rules, may be highlighted or otherwise indicated via the user interface. In some examples, only firewall rules with urgency measures above a threshold, or only log entries corresponding to such firewall rules, are displayed. In other embodiments, an interface may be automatically presented to an administrator for defining an exception to a firewall rule if the urgency measure for the firewall rule exceeds a threshold. In other embodiments, an alert is generated if an urgency measure of a firewall rule exceeds a threshold, such as if the firewall is running in protection mode. These are included as examples, and other techniques are possible for indicating firewall rules and/or corresponding log entries to an administrator based on urgency measures.

One or more firewall rule updates maybe received based on the urgency measures. For example, an administrator may define an exception or other change to a firewall rule in order to prevent false positives that the administrator identified in a log based on the urgency measures. In some embodiments, the firewall receives the firewall rule update and updates one or more firewall rules accordingly, such as by associating an exception with a firewall rule.

By focusing on firewall rules with higher urgency measures, false positives can be addressed more efficiently than with conventional techniques, such as reviewing entire logs that may contain very large numbers of entries. Accordingly, techniques described herein result in a more secure computing system due to improved identification and resolution of false positives, such as by modifying firewall rules.

Figure 1:
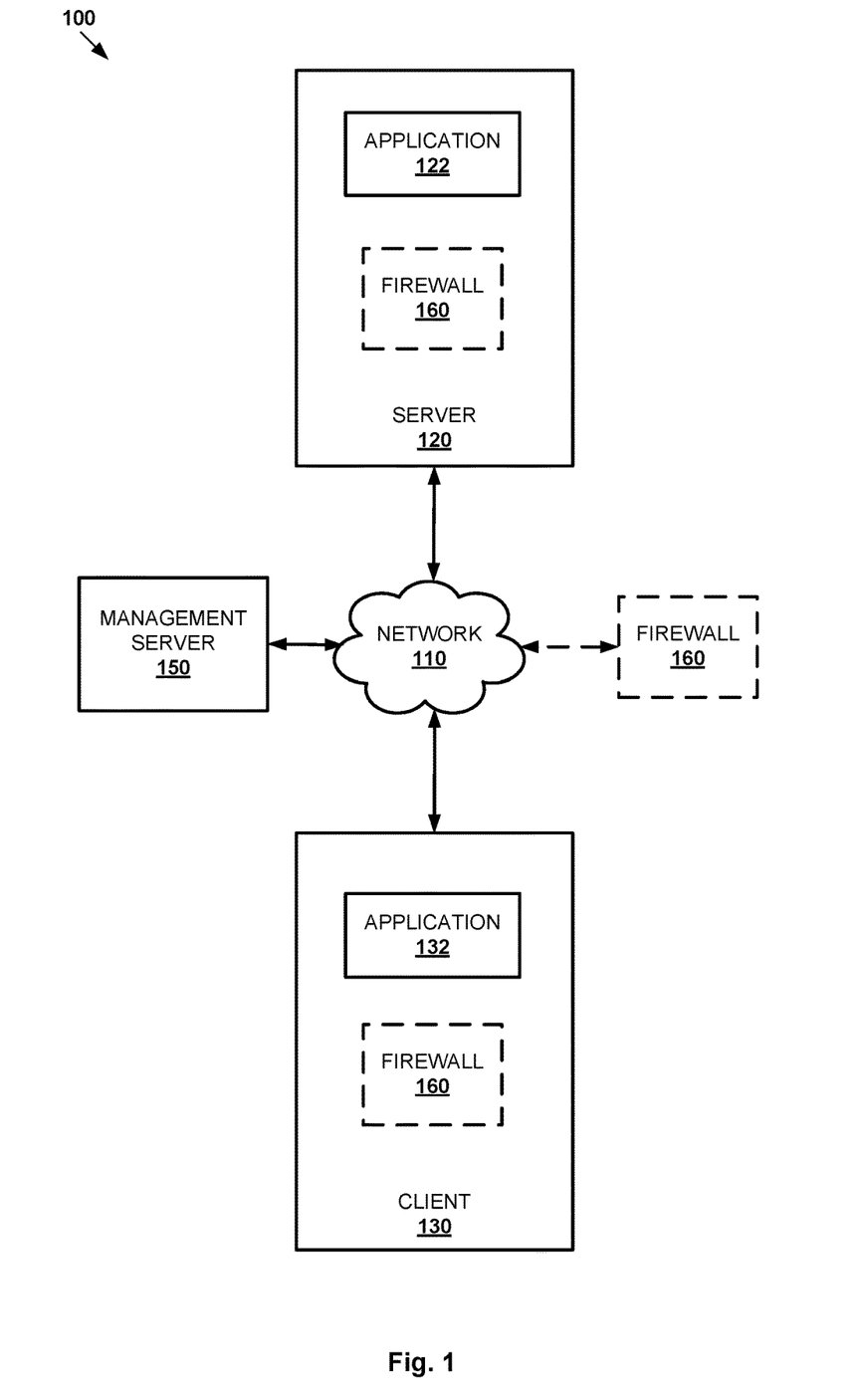
FIG. 1 illustrates a networking environment within which embodiments of the present disclosure may be implemented.

FIG. 1 illustrates a networking environment 100 within which embodiments of the present disclosure may be implemented. Networking environment 100 includes a server 120, a client 130, and a management server 150, connected via network 110. Network 110 is generally representative of a network of computing entities such as a local area network ("LAN") or a wide area network ("WAN"), a network of networks, such as the Internet, or any connection over which data may be transmitted. Networking environment 100 further includes a firewall 160, which may be alternatively be located on server 120, on client 130, or independently of server 120 and client 130.

Server 120 generally represents a computing device, such as a server computer. In certain embodiments, server 120 includes one or more processors and memory. Instructions may be stored on the memory, and may be executed by the one or more processors to perform techniques described herein. For example, instructions corresponding to application 122 and/or firewall 160 may be stored on the memory and executed by the one or more processors. Server 120 comprises an application 122, which is generally representative of a server-side component of a client-server application corresponding to the client-side component application 132 on client 130. In some examples, application 122 is a web application that is accessed over the internet via network 110 from application 132 on client 130.

Client 130 generally represents a computing device such as a desktop or laptop computer, mobile phone, tablet computer, or the like. In certain embodiments, client 130 includes one or more processors and memory. Instructions may be stored on the memory, and may be executed by the one or more processors to perform techniques described herein. For example, instructions corresponding to application 132 and/or firewall 160 may be stored on the memory and executed by the one or more processors. Client 130 includes application 132, which generally represents a client-side component of a client-server application corresponding to the server-side component application 122 on server 120. In some embodiments, application 132 is a web browser through which a user accesses a web application represented by application 122. In some embodiments, application 132 retrieves content from application 122 by sending hypertext transfer protocol (HTTP) requests to application 122, such as using methods provided by an application programming interface (API) of application 122.

Management server 150 generally represents a computing device or a component of a computing device that provides management functions with respect to components of networking environment 100, such as firewall 160. In some embodiments, management server 150 is implemented as part of server 120, client 130, or firewall 160, while in other embodiments it is implemented on a separate computing device. Management server 150 generally allows an administrator to perform administrative tasks related to networking environment 100, such as configuration of firewall 160. In some embodiments, an administrator accesses a user interface associated with management server 150 in order to configure and view firewall rules, review logs, define exceptions to firewall rules, and the like.

Firewall 160 generally represents a firewall configured to protect application 122 from attacks, such as malicious requests. In some embodiments, firewall 160 is a rule-based firewall that applies firewall rules to request in order to determine whether the requests should be allowed or denied. Firewall 160 may, for instance, be a web application firewall. Firewall 160 may be located on server 120, client 130, or may be located on a separate computing device. For example, firewall 160 may be a vendor-provided firewall that an administrator of server 120 deploys to protect application 122. In some embodiments, firewall rules for firewall 160 are defined by a creator of firewall 160, such as by a vendor that supplies firewall 160. In other embodiments, firewall rules are defined by an administrator of server 120. In other embodiments, firewall rules include community-validated rules or rules that have been approved by a trusted authority.

Firewall rules are generally applied by firewall 160 to packets that are transmitted within networking environment 100, such as requests transmitted from application 132 to application 122. In some embodiments, routing tables are configured such that all packets transmitted to a particular destination, such as application 122, are routed through firewall 160 or mirrored to firewall 160.

A firewall rule may specify, for example, that a request is deemed an attack if it accesses server 120 via an IP address of server 120 directly rather than a web address such as a universal resource locator (URL). Some firewall rules may be used in combination to determine whether a request is an attack. In some embodiments, each firewall rule is assigned an anomaly score indicating a severity of a threat against which the firewall rule is designed to protect. For example, a firewall rule that is designed to protect against accidental misuse of application 122 is assigned a lower anomaly score than a firewall rule designed to protect against a malicious attack. Anomaly scores may be assigned, for example, by a vendor that provides firewall 160, through community validation, or by a subject matter expert. In some embodiments, if a request triggers one or more firewall rules, the anomaly scores of the firewall rules are aggregated (e.g., added) together to determine whether the request is an attack, such as based on whether or not the sum or another function of the anomaly scores exceeds a threshold. If a request is determined to be an attack, it may be denied and/or logged as an attack. For example, if firewall 160 is configured to run in detection mode, such as via management server 150, then requests determined to be attacks may be logged but not denied. If firewall 160 is configured to run in protection mode, however, requests determined to be attacks may be denied.

According to certain embodiments, every time firewall 160 determines a request to be an attack based on one or more firewall rules being triggered, it increments a deny count for each of the one or more firewall rules that were triggered by one. For example, firewall 160 may be run in detection mode for a certain amount of time (or, in some embodiments, until a web crawler has gone through all pages of the application) to determine a deny count for each of a plurality of firewall rules. In other embodiments, deny counts may be determined while running firewall 160 in protection mode. The deny counts may then be used in conjunction with the anomaly scores for the plurality of firewall rules to determine urgency measures for the plurality of firewall rules.

In one example, firewall 160 determines an urgency measure for a given firewall rule by multiplying the deny count for the given firewall rule by the anomaly score for the given firewall rule. The product of this multiplication may then be normalized based on deny counts and anomaly scores for all of the plurality of firewall rules in order to produce a value within a certain range. For example, the product may be multiplied by 100 and then divided by the sum of products from all of the plurality of firewall rules (e.g., a product is determined for each of the plurality firewall rules by multiplying the deny count for the firewall rule by the anomaly score for the firewall rule and then all of the products are added together to produce the sum). The result of these calculations is the urgency measure for the given firewall rule, and may be a value between zero and one hundred.

The urgency measures for the plurality of firewall rules are used to perform certain actions related to resolving false positives. For example, the urgency measures may be used to determine an order for displaying the firewall rules via a user interface associated with management server 150. An administrator may access the user interface to review logged results from detection mode (or, in some embodiments, protection mode) in order to identify false positives and define exceptions to firewall rules as appropriate to prevent the false positives. The firewall rules may be displayed in a particular way based on urgency measure to the administrator via the user interface so that the administrator's attention may be focused on firewall rules with high urgency measures. For example, the firewall rules may be ordered, highlighted, filtered, or otherwise arranged for review based on urgency measures. In certain embodiments, logged results may be sorted, filtered, arranged, highlighted, or searched based on urgency measures of firewall rules. The administrator may determine which requests were falsely determined to be attacks based on firewall rules with high urgency measures, and may define exceptions for these firewall rules as appropriate to prevent future false positives. The firewall may receive firewall rule updates, such as exceptions, input by the administrator, and may update firewall rules accordingly. In some cases, focusing only on firewall rules with the highest urgency measures is sufficient to eliminate a substantial number of false positives.

Figure 2:
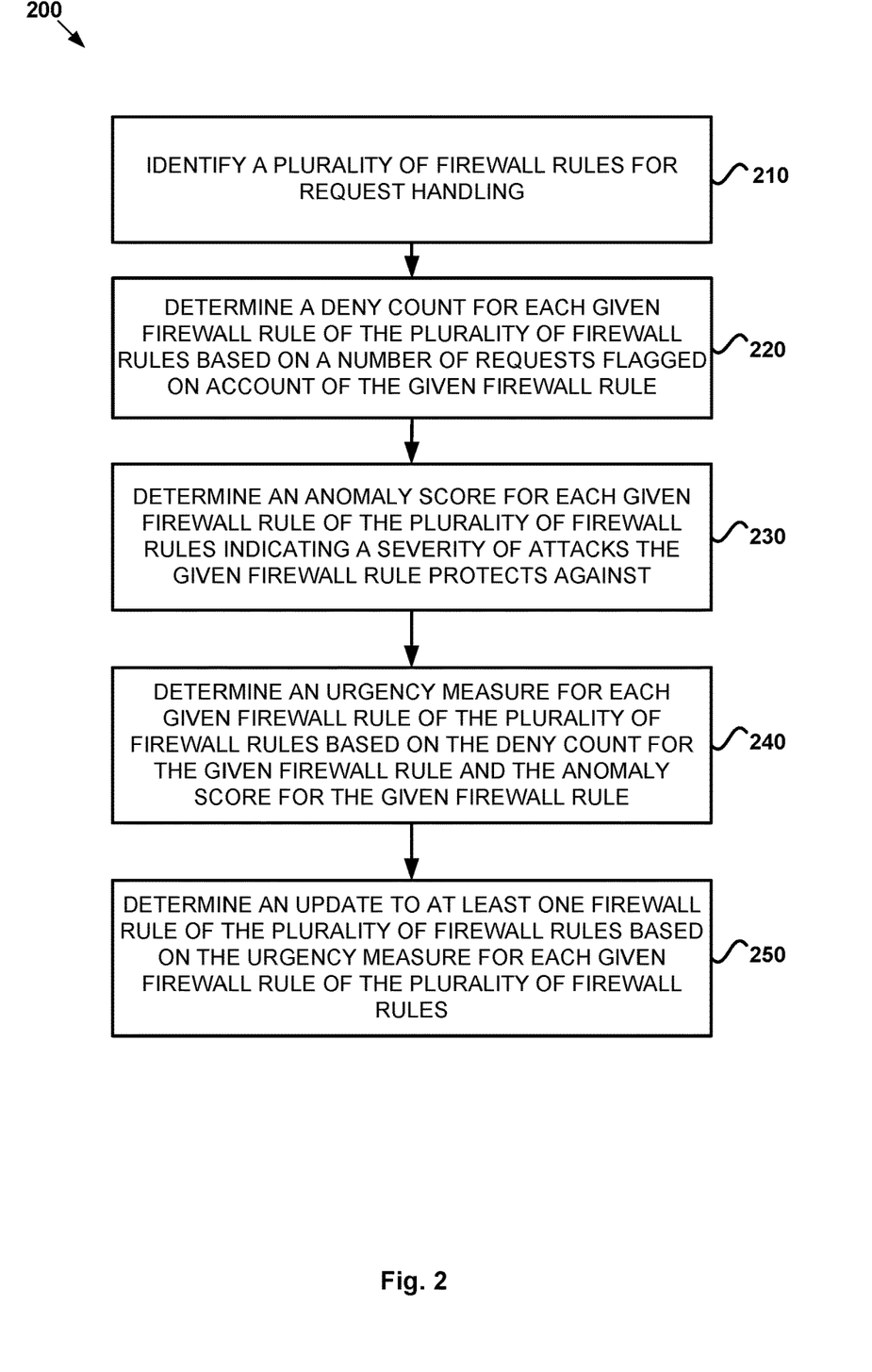
FIG. 2 illustrates example operations for managing firewall rules.

FIG. 2 illustrates example operations 200 for managing firewall rules. In some embodiments, operations 200 are performed by firewall 160 of FIG. 1 and/or by a component associated with firewall 160 of FIG. 1.

Operations 200 begin at step 210, where a plurality of firewall rules for request handling are identified. In some embodiments, the plurality of firewall rules are applied to requests sent to a web application in order to determine whether the requests are attacks and/or whether to deny the requests.

At step 220, a deny count is determined for each given firewall rule of the plurality of firewall rules based on a number of requests flagged on account of the given firewall rule. For instance, each time a request is flagged (e.g., determined to be an attack and/or denied) based on one or more firewall rules being triggered, the deny count of each of the one or more firewall rules that were triggered is incremented by one.

At step 230, an anomaly score is received for each given firewall rule of the plurality of firewall rules indicating a severity of attacks the given firewall rule protects against. In some embodiments, anomaly scores are assigned to firewall rules based on the types of attacks against which the firewall rules are designed to protect such that firewall rules designed to protect against minor attacks are assigned lower anomaly scores and firewall rules designed to protect against major attacks are assigned higher anomaly scores.

At step 240, an urgency measure is determined for each given firewall rule of the plurality of firewall rules based on the deny count for the given firewall rule and the anomaly score for the given firewall rule. In some embodiments, the deny count for the given firewall rule is multiplied by the anomaly score for the given firewall rule, resulting in a product. The product may then be normalized based on the deny count for each given firewall rule of the plurality of firewall rules and the anomaly score for each given firewall rule of the plurality of firewall rules. For example, the product may be multiplied by 100 and divided by a sum value that is determined by multiplying the deny count for each respective firewall rule of the plurality of firewall rules by the anomaly score for the respective firewall rule and then adding the products of all of these multiplications together. As such, the urgency measure may be a number between 0 and 100.

In some embodiments, each time a request is flagged based on or more firewall rules being triggered, the deny count of each of the one or more firewall rules that were triggered is incremented by one and then the urgency measures of all of the plurality of firewall rules are updated based on the incremented deny count(s).

At step 250, an update to at least one firewall rule of the plurality of firewall rules is determined based on the urgency measure for each given firewall rule of the plurality of firewall rules. For example, an order for displaying the plurality of firewall rules may be determined based on the urgency measure for each given firewall rule of the plurality of firewall rules, and the plurality of firewall rules may be displayed via a user interface in the order for use in identifying logged false positives so that exceptions to firewall rules may be defined as appropriate. The plurality of firewall rules may be ordered from highest urgency measure to lowest urgency measure. Input may be received, in response to the displaying, that defines the update via the user interface. The update may, for example, be an exception to the at least one firewall rule.

Figure 3:
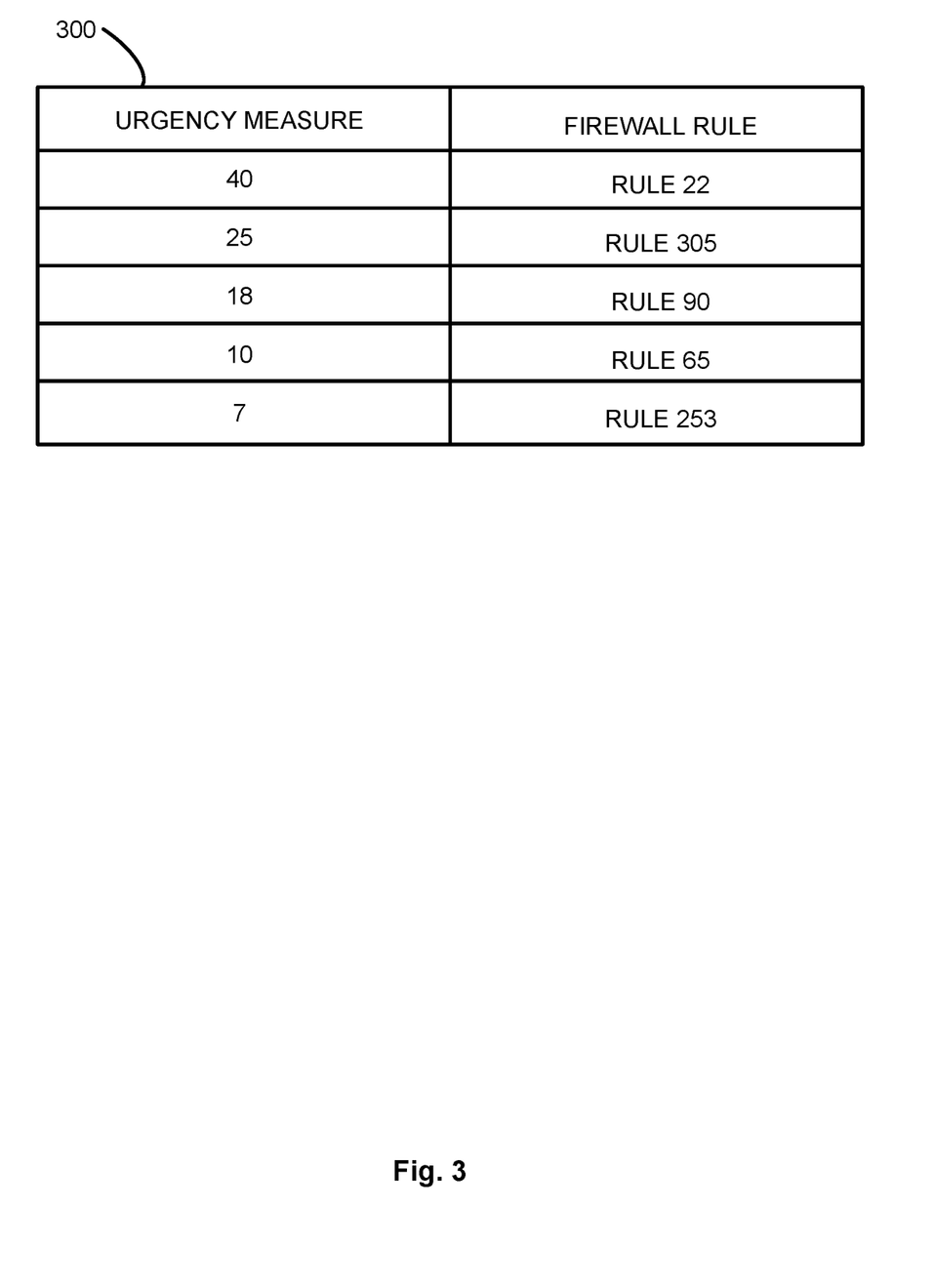
FIG. 3 illustrates an example user interface related to managing firewall rules.

FIG. 3 illustrates an example user interface 300 depicting firewall rules ordered according to urgency measure. For example, user interface 300 may be representative of a user interface associated with management server 150 of FIG. 1.

As shown in user interface 300, a plurality of firewall rules (RULE 22, RULE 305, RULE 90, RULE 65, and RULE 253, which may be representative of identifiers of a plurality of firewall rules) are shown in descending order of urgency measure (40, 25, 18, 10, and 7).

In some embodiments, a user may select a given firewall rule in user interface 300, such as RULE 22, in order to view additional information about the firewall rule and/or to perform configuration tasks related to the firewall rule, such as defining exceptions to the firewall rule. In certain embodiments, the user may view logged results indicating requests that were flagged based on firewall rules, and may sort or search the logged results based on the urgency measures shown in user interface 300 in order to focus on firewall rules with higher urgency measures for identifying false positives and defining exceptions.

Figure 4:
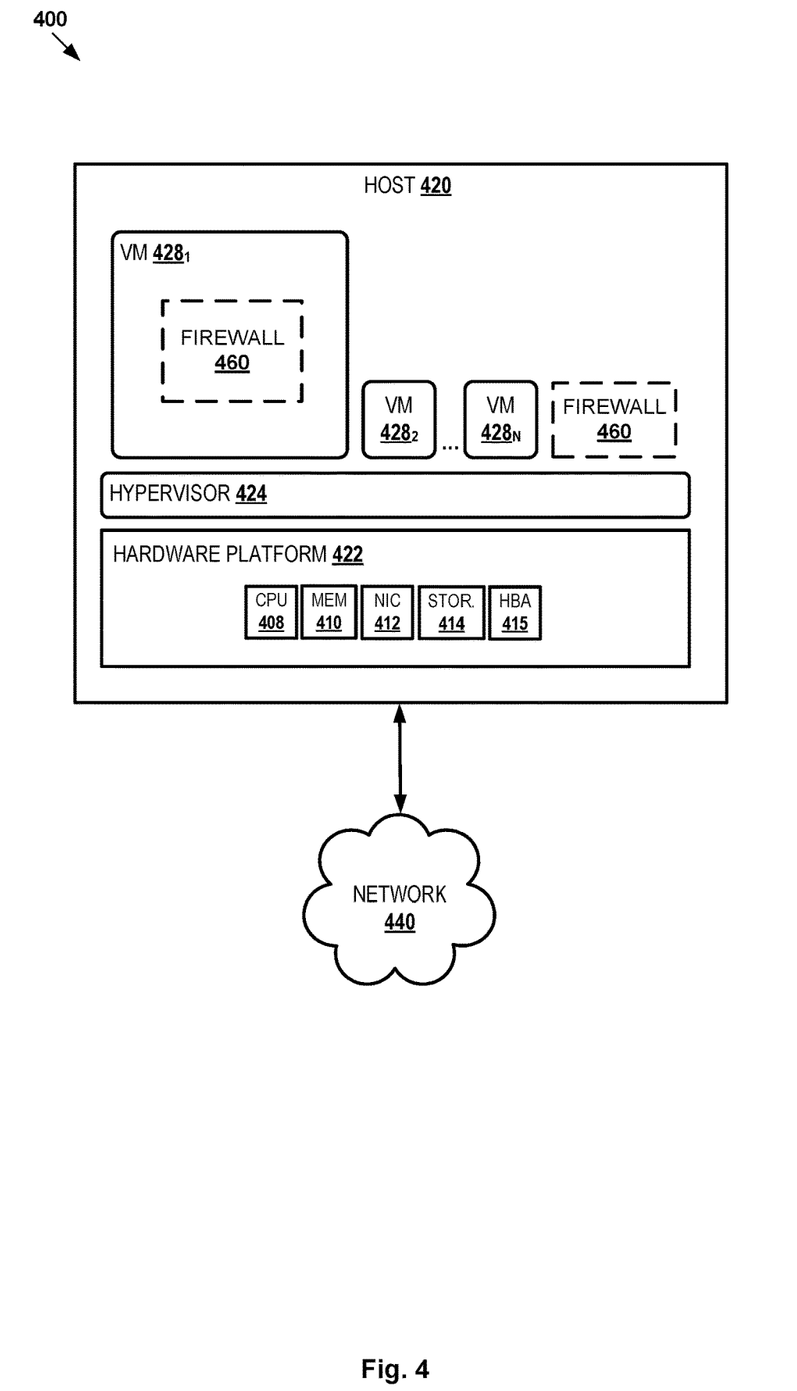
FIG. 4 illustrates an example computing environment in which embodiments of the present disclosure may be implemented.

FIG. 4 illustrates components of a computing environment 400 in which embodiments of the present disclosure may be implemented. As shown, computing environment 400 includes a host 420 connected to a network 440. Network 440 may, for example, be a local area network (LAN), wide area network (WAN), cellular data network, the Internet, or any connection over which data may be transmitted.

Host 420 is configured with a virtualization layer, referred to herein as hypervisor 424, that abstracts processor, memory, storage, and networking resources of hardware platform 422 into multiple virtual machines $428_1$ to $428_N$ (collectively referred to as VMs 428 and individually referred to as VM 428). VMs on the same host 420 may use any suitable overlaying guest operating system(s), and run concurrently with the other VMs.

Hypervisor 424 architecture may vary. In some aspects, hypervisor 424 can be installed as system level software directly on the hosts 420 (often referred to as a "bare metal" installation) and be conceptually interposed between the physical hardware and the guest operating systems executing in the VMs. Alternatively, hypervisor 424 may conceptually run "on top of" a conventional host operating system in the server. In some implementations, hypervisor 424 may comprise system level software as well as a privileged VM machine (not shown) that has access to the physical hardware resources of the host 420. In such implementations, a virtual switch, virtual tunnel endpoint (VTEP), etc., along with hardware drivers, may reside in the privileged VM.

Hardware platform 422 of host 420 includes components of a computing device such as one or more processors (CPUs) 408, a system memory 410, a network interface 412, a storage system 414, a host bus adapter (HBA) 415, and other I/O devices such as, for example, a USB interface (not shown). CPU 408 is configured to execute instructions such as executable instructions that perform one or more operations described herein. The executable instructions may be stored in memory 410 and in storage 414. Network interface 412 enables host 420 to communicate with other devices via a communication medium, such as network 440. Network interface 412 may include one or more network adapters or ports, also referred to as Network Interface Cards (NICs), for connecting to one or more physical networks.

Firewall 460 is generally representative of firewall 160 of FIG. 1, and may be located within one or more of VMs 428 or may be run separately (e.g., as a virtual appliance on top of hypervisor 424). Firewall 160 may alternatively be implemented within hypervisor 424. In certain embodiments, firewall 460 runs as a distributed service across VMs 428 and/or in a control plane associated with host 420.

In one embodiment, VM $428_2$ runs a web browser (not shown) that accesses a web application (not shown) on VM $428_1$ via HTTP requests. Firewall 460 may apply firewall rules to the requests in order to determine whether to flag the requests as attacks and/or deny the requests. Firewall 460 may maintain deny counters for firewall rules and perform other operations related to determining urgency measures described above with respect to FIGS. 1-3. In some embodiments, host 420 is connected with additional hosts, control components, and/or management components via network 440, and operations described herein related to firewall 460 may be performed on one or more of these hosts and/or components.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:
1. A method for managing firewall rules, comprising:
    identifying a plurality of firewall rules for request handling, wherein a firewall is configured to apply the plurality of firewall rules to packets transmitted in a networking environment;
    determining, based on the firewall applying the plurality of firewall rules to the packets transmitted in the networking environment, a deny count for each given firewall rule of the plurality of firewall rules based on a number of requests flagged on account of the given firewall rule;

determining an anomaly score for each given firewall rule of the plurality of firewall rules indicating a severity of attacks the given firewall rule protects against;

determining an urgency measure for each given firewall rule of the plurality of firewall rules based on the deny count for the given firewall rule and the anomaly score for the given firewall rule;

determining an update to at least one firewall rule of the plurality of firewall rules based on the urgency measure for each given firewall rule of the plurality of firewall rules; and modifying the at least one firewall rule based on the update.

2. The method of claim 1, wherein determining the urgency measure for a given firewall rule of the plurality of firewall rules comprises multiplying the deny count for the given firewall rule by the anomaly score for the given firewall rule to determine a product.

3. The method of claim 2, wherein determining the urgency measure for the given firewall rule of the plurality of firewall rules comprises normalizing the product based on the deny count for each given firewall rule of the plurality of firewall rules and the anomaly score for each given firewall rule of the plurality of firewall rules.

4. The method of claim 1, further comprising:
receiving a request;
flagging the request based on one or more firewall rules of the plurality of firewall rules; and
incrementing the deny count for each respective firewall rule of the one or more firewall rules to produce an updated deny count for the respective firewall rule.

5. The method of claim 4, further comprising updating the urgency measure for the respective firewall rule based on the updated deny count for the respective firewall rule.

6. The method of claim 1, wherein the plurality of firewall rules relate to a web application firewall.

7. The method of claim 1, wherein determining the update to the at least one firewall rule of the plurality of firewall rules based on the urgency measure for each given firewall rule of the plurality of firewall rules comprises:
determining an order for displaying the plurality firewall rules based on the urgency measure for each given firewall rule of the plurality of firewall rules;
displaying the plurality of firewall rules via a user interface in the order; and
receiving, in response to the displaying, input defining the update via the user interface.

8. The method of claim 7, wherein the update comprises an exception to the at least one firewall rule.

9. A computer system comprising: one or more processors; and a non-transitory computer-readable medium storing instructions that, when executed, cause the one or more processors to perform a method for managing firewall rules, the method comprising:
identifying a plurality of firewall rules for request handling, wherein a firewall is configured to apply the plurality of firewall rules to packets transmitted in a networking environment;
determining, based on the firewall applying the plurality of firewall rules to the packets transmitted in the networking environment, a deny count for each given firewall rule of the plurality of firewall rules based on a number of requests flagged on account of the given firewall rule;

determining an anomaly score for each given firewall rule of the plurality of firewall rules indicating a severity of attacks the given firewall rule protects against;

determining an urgency measure for each given firewall rule of the plurality of firewall rules based on the deny count for the given firewall rule and the anomaly score for the given firewall rule;

determining an update to at least one firewall rule of the plurality of firewall rules based on the urgency measure for each given firewall rule of the plurality of firewall rules; and modifying the at least one firewall rule based on the update.

10. The computer system of claim 9, wherein determining the urgency measure for a given firewall rule of the plurality of firewall rules comprises multiplying the deny count for the given firewall rule by the anomaly score for the given firewall rule to determine a product.

11. The computer system of claim 10, wherein determining the urgency measure for the given firewall rule of the plurality of firewall rules comprises normalizing the product based on the deny count for each given firewall rule of the plurality of firewall rules and the anomaly score for each given firewall rule of the plurality of firewall rules.

12. The computer system of claim 9, wherein the method further comprises:
receiving a request;
flagging the request based on one or more firewall rules of the plurality of firewall rules; and
incrementing the deny count for each respective firewall rule of the one or more firewall rules to produce an updated deny count for the respective firewall rule.

13. The computer system of claim 12, wherein the method further comprises updating the urgency measure for the respective firewall rule based on the updated deny count for the respective firewall rule.

14. The computer system of claim 9, wherein the plurality of firewall rules relate to a web application firewall.

15. The computer system of claim 9, wherein determining the update to the at least one firewall rule of the plurality of firewall rules based on the urgency measure for each given firewall rule of the plurality of firewall rules comprises:
determining an order for displaying the plurality firewall rules based on the urgency measure for each given firewall rule of the plurality of firewall rules;
displaying the plurality of firewall rules via a user interface in the order; and
receiving, in response to the displaying, input defining the update via the user interface.

16. The computer system of claim 15, wherein the update comprises an exception to the at least one firewall rule.

17. A non-transitory computer readable medium comprising instructions that, when executed by one or more processors of a computing system, cause the computing system to perform a method for managing firewall rules, the method comprising:
identifying a plurality of firewall rules for request handling, wherein a firewall is configured to apply the plurality of firewall rules to packets transmitted in a networking environment;
determining, based on the firewall applying the plurality of firewall rules to the packets transmitted in the networking environment, a deny count for each given firewall rule of the plurality of firewall rules based on a number of requests flagged on account of the given firewall rule;

determining an anomaly score for each given firewall rule of the plurality of firewall rules indicating a severity of attacks the given firewall rule protects against;

determining an urgency measure for each given firewall rule of the plurality of firewall rules based on the deny count for the given firewall rule and the anomaly score for the given firewall rule;

determining an update to at least one firewall rule of the plurality of firewall rules based on the urgency measure for each given firewall rule of the plurality of firewall rules; and modifying the at least one firewall rule based on the update.

18. The non-transitory computer readable medium of claim 17, wherein determining the urgency measure for a given firewall rule of the plurality of firewall rules comprises multiplying the deny count for the given firewall rule by the anomaly score for the given firewall rule to determine a product.

19. The non-transitory computer readable medium of claim 18, wherein determining the urgency measure for the given firewall rule of the plurality of firewall rules comprises normalizing the product based on the deny count for each given firewall rule of the plurality of firewall rules and the anomaly score for each given firewall rule of the plurality of firewall rules.

20. The non-transitory computer readable medium of claim 17, wherein the method further comprises:

receiving a request;

flagging the request based on one or more firewall rules of the plurality of firewall rules; and incrementing the deny count for each respective firewall rule of the one or more firewall rules to produce an updated deny count for the respective firewall rule.

* * * * *